United States Patent Office 2,745,876
Patented May 15, 1956

2,745,876

PREPARATION OF ALPHA-HALO-NITRO-ACETOPHENONES

Ezra Monroe and Samuel Wendell Long, Midland, Mich., assignors to The Dow Chemical Company, Midland, Mich., a corporation of Delaware No Drawing. Application June 2, 1952,
Serial No. 291,316

13 Claims. (Cl. 260—592)

This invention relates to the preparation of haloalkyl nitroaryl ketones and related compounds.

More particularly, the end products of the process of the invention are alpha-halo-nitroacetophenones. Especially desirable is the compound alpha-bromo-para-nitroacetophenone which is a starting material in the synthesis of the antibiotic chloramphenicol ("Chloromycetin") in the process of Long and Troutman described in J. A. C. S. 71, 2473–5 (1949).

The methods known in the art for preparing alpha-halo-nitroacetophenones and particularly alpha-bromo-para-nitroacetophenone are both difficult and time consuming, and are further characterized by low conversions and yields.

The present invention for producing alpha-halo-nitroacetophenones overcomes the objections of the prior art by a process comprising hydrolysis and subsequent oxidation of alpha-halomethyl-nitrobenzyl nitrates corresponding to the general formula

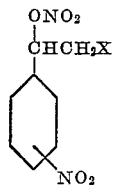

wherein X is a member of the group consisting of bromine and chlorine. These compounds are produced by the nitration of alpha-(halomethyl)benzyl alcohols and (1,2-dihaloethyl)benzenes according to the processes disclosed in co-pending applications Serial No. 291,303 and Serial No. 291,304 filed simultaneously herewith.

According to the present invention, alpha-(halomethyl)-nitrobenzyl nitrates are hydrolyzed to alpha-(halomethyl)nitrobenzyl alcohols in the presence of aqueous hydrohalic acids. The resulting alpha-(halomethyl)nitrobenzyl alcohols are subsequently oxidized with chromic acid to alpha-halo-nitroacetophenones.

The hydrolysis of alpha-(halomethyl)nitrobenzyl nitrates is normally carried out batchwise by contacting the organic nitrate compound with strong hydrohalic acid at a temperature above 30° C. Greater than one molecular proportion of hydrohalic acid is generally charged into the reaction vessel together with one molecular proportion of alpha-(halomethyl)nitrobenzyl nitrate and gradually heated to the desired temperature. Satisfactory results have been obtained by carrying out the hydrolysis with strong hydrohalic acid of greater than 50 per cent concentration at approximately 50° C. Somewhat higher temperatures than 100° C. may be employed, and are sometimes required, when more dilute acid is used. Gaseous hydrogen halide may be passed into the reaction mixture to replace hydrohalic acid oxidized to halogen by the nitric acid liberated during the hydrolysis of the organic nitrate compound. An effective concentration of hydrohalic acid, e. g. greater than one mole of hydrohalic acid per mole of the organic nitrate compound to be hydrolyzed, may more preferably be maintained throughout the hydrolysis reaction by passing a reducing agent such as gaseous sulfur dioxide into the reaction mixture. Agitation is generally provided to bring the reactants into close contact during the reaction. The reactants may be brought into even more intimate contact by the use of a haloalkane solvent such as methyl-chloroform. With the aid of solvents which are inert under the conditions of the reaction, the hydrolysis of alpha-(halomethyl)nitrobenzyl nitrates has been effectively carried out in a continuous process. The reaction is generally controlled to give maximum conversions to alpha-(halomethyl)nitrobenzyl alcohols. At optimum conditions for the hydrolysis, high conversions and yields are obtained.

The organic product from the hydrolysis may be separated from the reaction mixture and employed per se in the oxidation reaction. It is generally desirable, however, to pour the total reaction mixture into several volumes of cold water, preferably ice water, and separate crystalline alpha-(halomethyl)nitrobenzyl alcohol therefrom. To purify the crystalline product, the alpha-(halomethyl)nitrobenzyl alcohol may, if desired, be washed with water and recrystallized from a haloalkane solvent, such as carbon tetrachloride, methyl-chloroform, mixtures of carbon tetrachloride and methylene chloride, etc.

The alpha-(halomethyl)nitrobenzyl alcohols so produced may be oxidized with chromic acid to alpha-halo-nitroacetophenones. As hereinbefore mentioned, either crude or purified alpha-(halomethyl)nitrobenzyl alcohols may be employed in the oxidation reaction. The oxidation is generally accomplished by treating with aqueous chromic acid in the presence of sulfuric acid, a well-agitated solution of an alpha-(halomethyl)nitrobenzyl alcohol in concentrated acid, such as acetic acid or sulfuric acid. Somewhat higher yields of alpha-halo-nitroacetophenones are usually obtained when concentrated acetic acid, rather than sulfuric acid, is employed to dissolve the alpha-(halomethyl)nitrobenzyl alcohol. Generally two molecular proportions of chromic acid to three molecular proportions of alpha-(halomethyl)nitrobenzyl alcohol are employed in the oxidation. The reaction temperature is maintained below 100° C. and preferably below 50° C. The duration of the oxidation run is usually no longer than the time required to add chromic acid to the nitrobenzyl alcohol and still maintain the desired temperature. Solid crystalline alpha-halo-nitroacetophenone is generally filtered directly from the cool reaction mixture although dilution with water prior to filtration may sometimes increase the recovery. The filtered product is usually washed with water prior to drying and may be subsequently purified by recrystallization from solvents, such as alcohols, the haloalkane solvents hereinbefore mentioned, etc.

The present invention is illustrated but not limited to the following examples:

Example 1

Alpha-bromo-para-nitroacetophenone was prepared by the hydrolysis and subsequent oxidation of the total reaction product from the nitration of alpha-(bromomethyl)benzyl alcohol as hereinafter described.

Into a two-liter flask partly immersed in an ice bath were charged 209 grams of 96 weight per cent sulfuric acid and 559 grams of nearly anhydrous mixed acid composed of equal weights of nitric and sulfuric acid. To the vigorously agitated mixed acid in the flask containing 4.4 moles of nitric acid was gradually added a solution of 402 grams (2.0 moles) of alpha-(bromomethyl)benzyl alcohol in 600 grams of CH₃CCl₃ during a period of 124 minutes while maintaining the temperature of the reaction mixture at 15° to 28° C. Thereafter, the total reaction product was drowned in 2 kilograms of cold water and the organic portion was separated therefrom.

The above described organic portion was returned to the reaction flask and 1012 grams (6.0 moles) of 48 weight per cent hydrobromic acid together with 220 grams (2.15 moles) of 96 weight per cent sulfuric acid were added. Heat was applied to the flask and 218 grams (3.4 moles) of gaseous sulfur dioxide was bubbled into the agitated reaction mixture maintained at 50° to 64° C. during a period of 225 minutes. Thereafter, the organic portion was separated, washed with water, and found to weigh 831 grams. From a small portion of this material was obtained alpha-(bromomethyl)-para-nitrobenzyl alcohol in good yield.

The larger portion of washed organic material from the hydrolysis reaction weighing 623 grams was returned to the reaction flask. To dissolve the organic material, 200 grams of glacial acetic acid was added. The oxidation was then carried out by gradually adding to the contents of the flask, a solution of 100 grams (1.0 mole) of chromic acid ($CrO_3$) in 100 grams of water simultaneously with 400 grams of 80 weight per cent sulfuric acid during a period of 60 minutes. The temperature was maintained at 30° to 42° C. throughout the oxidation. After cooling the total reaction mixture to approximately 5° C., crude crystalline alpha-bromo-para-nitroacetophenone was removed by filtration and washed with water. The dry solid material weighed 106 grams and melted from 93° to 98° C. From the filtrate oil was obtained another 8.5 grams of crude dry alpha-bromo-para-nitroacetophenone. The yield of crude alpha-bromo-para-nitroacetophenone based on alpha-(bromomethyl)benzyl alcohol charged was 31.3 weight per cent. Recrystallization from methyl-chloroform gave a slightly lower yield of purified alpha-bromo-para-nitroacetophenone melting from 97° to 100.5° C.

*Example 2*

The hydrolysis of alpha-(bromomethyl)nitrobenzyl nitrate with hydrobromic acid was conducted in a two-liter flask provided with a mechanical stirrer, gas bubbler tube for hydrogen bromide, and means for heating. Into the flask were charged 291 grams (1 mole) of aplha-(bromomethyl)-para-nitrobenzyl nitrate and 723 grams (5 moles) of 56 weight per cent hydrobromic acid. Gaseous hydrogen bromide was slowly passed into the agitated contents of the flask and the temperature gradually rose to 48° C. over a period of 20 minutes. While the temperature was then maintained at 48° to 54° C. for two hours, a total of 230 grams (2.84 moles) of gaseous hydrogen bromide was added. Thereafter, the reaction mixture was poured into ice and water to crystallize the alpha-(bromomethyl)-para-nitrobenzyl alcohol produced by the reaction. The bulk of the liquid was decanted from the crystalline solid which was washed with water and filtered. Approximately 274 grams of crude wet alpha-(bromomethyl)-para-nitrobenzyl alcohol was obtained which, after drying, melted at 79° to 84° C. On recrystallization of this product from a solution consisting of 400 ml. of carbon tetrachloride and 100 ml. of methylene chloride, 193 grams of purified white crystalline alpha-(bromomethyl)-para-nitrobenzyl alcohol melting at 86° to 87° C. was obtained. This represents a 78.5 weight per cent yield of product. On cooling the carbon tetrachloride-methylene chloride solution to −10° C., another 7.5 grams of product melting at 85° to 87° C. was recovered. This raised the total yield of alpha-(bromomethyl)-para-nitrobenzyl alcohol to 81.6 weight percent.

*Example 3*

Alpha-(bromomethyl)-para-nitrobenzyl alcohol prepared according to the procedure of Example 2 was dissolved in acetic acid and oxidized with chromic acid. Into a 500 ml. round-bottom flask provided with a mechanical stirrer was charged 73.8 grams (0.3 mole) of alpha-(bromomethyl)-para-nitrobenzyl alcohol dissolved in 175 mls. of 15 normal acetic acid. A solution of 20 grams (0.2 mole) of chromic acid ($CrO_3$) dissolved in 40 ml. of water was added to the agitated contents of the flask simultaneously with 25 ml. of 96 weight per cent sulfuric acid over a period of 20 minutes. The temperature of the reaction was kept below 45° C. by partly immersing the reaction flask in a water bath to dissipate the heat of reaction. After adding all of the chromic acid, the reaction mixture was diluted with 15 ml. of water. Thereupon the reaction mixture was cooled to approximately 25° C., and the solid alpha-bromo-para-nitroacetophenone produced during the reaction was removed by filtration, washed with 200 ml. of water, and dried. The dry white crystalline product weighed 68 grams and melted at 96.5° to 99° C. This represents a yield of alpha-bromo-para-nitroacetophenone of 93 weight per cent.

*Example 4*

Alpha-(bromomethyl)-para-nitrobenzyl alcohol was dissolved in sulfuric acid and oxidized with chromic acid according to the following procedure. Approximately 37 grams (0.15 mole) of alpha-(bromomethyl)-para-nitrobenzyl alcohol and 100 grams of water were charged into a 500 ml. flask. To the agitated mixture was added 120 grams of 96 weight per cent sulfuric acid which heated the solution to 90° C. A solution of 10 grams of chromic acid ($CrO_3$) in 10 grams of water was slowly added to the hot sulfuric acid solution of alpha-(bromomethyl)-para-nitrobenzyl alcohol maintained at 90° to 105° C. After adding all of the aqueous chromic acid, the reaction mixture was cooled and crude solid alpha-bromo-para-nitroacetophenone was separated therefrom. The crude material was recrystallized from alcohol and 30 grams of dry purified alpha-bromo-para-nitroacetophenone melting at 97° to 99° C. was obtained. This represents a yield of about 82 weight per cent.

*Example 5*

The hydrolysis of 24.4 grams (0.08 mole) of alpha-(bromomethyl)-3-methyl-4-nitrobenzyl nitrate was carried out in a 500 ml. flask employing 315 grams (2.45 moles) of 63 weight per cent hydrobromic acid. The agitated reaction mixture was heated in the temperature range of 25° to 45° C. for 95 minutes and then poured over cracked ice. Solid alpha-(bromomethyl)-3-methyl-4-nitrobenzyl alcohol crystallized from the cold dilute hydrobromic acid solution and was separated therefrom. After recrystallizing the solid first from carbon tetrachloride and then from methyl-chloroform, 7.5 grams of purified white crystalline alpha-(bromomethyl)-3-methyl-4-nitrobenzyl alcohol melting at 59° to 61° C. was obtained.

*Example 6*

Alpha-chloro-para-nitroacetophenone was prepared by the hydrolysis and subsequent oxidation of alpha-(chloromethyl)-para-nitrobenzyl nitrate as hereinafter described.

The hydrolysis of alpha-(chloromethyl)-para-nitrobenzyl nitrate was carried out in a 500 ml. flask equipped with reflux condenser, thermometer, heating mantle, and motor driven stirrer. Into the flask was charged 24.6 grams (0.1 mole) of alpha-(chloromethyl)-para-nitrobenzyl nitrate and 100 ml. of 37 weight per cent hydrochloric acid. The agitated mixture was heated slowly to 100° C. and maintained at 100° to 107° C. for a period of 135 minutes. During this time, greenish-brown fumes were evolved. When the hydrolysis was essentially complete, the colored fumes had virtually disappeared. Thereafter the reaction mixture was poured onto 200 grams of ice and the crystalline alpha-(chloromethyl)-para-nitrobenzyl alcohol was separated therefrom. The yield of dry alpha-(chloromethyl)-para-nitrobenzyl alcohol weighing 19.5 grams and melting at 78° to 81° C. was 97 weight per cent.

The oxidation of 12.1 grams (0.06 mole) of the dry solid alpha-(chloromethyl)-para-nitrobenzyl alcohol from the preceding hydrolysis was carried out in a 500 ml. flask provided with a reflux condenser, thermometer, and motor driven stirrer. The alpha-(chloromethyl)-para-nitrobenzyl alcohol was first dissolved in 25 ml. of glacial acetic acid. Then a solution of 4.0 grams (0.04 mole) of chromic acid ($CrO_3$) in 10 ml. of water was added to the contents of the flask simultaneously with 10 ml. of 96 weight per cent sulfuric acid during a period of 20 minutes. During the run, the temperature of the reaction mixture was maintained in the temperature range of 40° to 55° C. by partly immersing the flask in a cold water bath. Thereafter, the reaction mixture was cooled by the addition of 25 grams of cracked ice and filtered to remove crystalline alpha-chloro-para-nitroacetophenone. After recrystallization from alcohol, the dry purified alpha-chloro-para-nitroacetophenone weighed 8.8 grams and melted at 87° to 89.5° C. The yield based on alpha-(chloromethyl)-para-nitrobenzyl alcohol was 77 weight per cent.

We claim:

1. The method of preparing an alpha-(halomethyl) nitrobenzyl alcohol which comprises hydrolyzing an alpha-(halomethyl)nitrobenzyl nitrate in which the halomethyl radical is from the group consisting of bromomethyl and chloromethyl in the presence of greater than one molecular proportion of an aqueous hydrohalic acid from the group consisting of hydrobromic acid and hydrochloric acid at a temperature above 30° C.

2. The method of preparing an alpha-(halomethyl) nitrobenzyl alcohol which comprises hydrolyzing an alpha-(halomethyl)nitrobenzyl nitrate in which the halomethyl radical is from the group consisting of bromomethyl and chloromethyl in the presence of greater than one molecular proportion of aqueous hydrochloric acid at a temperature above 30° C.

3. The method according to claim 2 wherein the alpha-(halomethyl)nitrobenzyl nitrate is alpha-(chloromethyl)-para-nitrobenzyl nitrate.

4. The method of preparing an alpha-(halomethyl) nitrobenzyl alcohol which comprises hydrolyzing an alpha-(halomethyl)nitrobenzyl nitrate in which the halomethyl radical is from the group consisting of bromomethyl and chloromethyl in the presence of greater than one molecular proportion of aqueous hydrobromic acid at a temperature above 30° C.

5. The method according to claim 4 wherein the alpha-(halomethyl)nitrobenzyl nitrate is alpha-(bromomethyl)-para-nitrobenzyl nitrate.

6. The method according to claim 4 wherein the alpha-(halomethyl)nitrobenzyl nitrate is alpha-(bromomethyl)-3-methyl-4-nitrobenzyl nitrate.

7. The method according to claim 4 wherein an effective concentration of hydrobromic acid is maintained by the addition of sulfur dioxide.

8. The method of preparing alpha-(bromomethyl)-para-nitrobenzyl alcohol which comprises hydrolyzing alpha-(bromomethyl)-para-nitrobenzyl nitrate in the presence of greater than one molecular proportion of aqueous hydrobromic acid at a temperature of from above 30° C. to about 100° C., passing gaseous sulfur dioxide into the reactants to maintain an effective concentration of hydrobromic acid, diluting the reaction mixture with water to crystallize solid alpha-(bromomethyl)-para-nitrobenzyl alcohol, and thereafter separating the alpha-(bromomethyl)-para-nitrobenzyl alcohol.

9. In a method of preparing an alpha-halo-nitroacetophenone, the step which comprises hydrolyzing an alpha-(halomethyl)nitrobenzyl nitrate in which the halomethyl radical is from the group consisting of bromomethyl and chloromethyl to an alpha-(halomethyl)-nitrobenzyl alcohol in the presence of greater than one molecular proportion of an aqueous hydrohalic acid from the group consisting of hydrobromic acid and hydrochloric acid at a temperature above 30° C., and thereafter separating the organic portion from the reaction mixture, dissolving the same in concentrated acid, and treating the resulting solution with chromic acid in the presence of sulfuric acid.

10. In a method of preparing an alpha-bromo-nitroacetophenone, the step which comprises hydrolyzing an alpha-(bromomethyl)nitrobenzyl nitrate to an alpha-(bromomethyl)-nitrobenzyl alcohol in the presence of greater than one molecular proportion of hydrobromic acid at a temperature above 30° C., and thereafter separating the organic portion from the reaction mixture, dissolving the same in concentrated acid, and treating the resulting solution with chromic acid in the presence of sulfuric acid.

11. The method according to claim 10 wherein an effective concentration of hydrobromic acid is maintained by the addition of sulfur dioxide.

12. The method according to claim 11 wherein acetic acid is employed to dissolve the organic portion from the reaction mixture.

13. The method according to claim 11 wherein sulfuric acid is employed to dissolve the organic portion from the reaction mixture.

References Cited in the file of this patent

UNITED STATES PATENTS

| | | |
|---|---|---|
| 2,058,373 | Weissenkorn | Oct. 20, 1936 |
| 2,114,286 | Britton | Apr. 19, 1938 |
| 2,315,557 | Soday | Apr. 6, 1943 |
| 2,376,674 | Emerson | May 22, 1945 |
| 2,382,867 | Emerson | Aug. 14, 1945 |
| 2,402,315 | Crowder | June 18, 1946 |
| 2,619,505 | Wilkinson | Nov. 25, 1952 |

FOREIGN PATENTS

| | | |
|---|---|---|
| 364,039 | Germany | Nov. 16, 1922 |

OTHER REFERENCES

Arndt et al.: "Berichte" (1928), vol. 61, pp. 1110–1113.

Groggins: Unit Processes in Organic Synthesis, 3rd ed., McGraw Hill, 1947, pp. 673 and 677.